(12) United States Patent
Iinuma

(10) Patent No.: US 8,628,257 B2
(45) Date of Patent: Jan. 14, 2014

(54) IMAGE-PICKUP APPARATUS, CAMERA GRIP, AND IMAGE-PICKUP SYSTEM

(71) Applicant: Canon Kabushiki Kaisha, Tokyo (JP)

(72) Inventor: Futoshi Iinuma, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/660,014

(22) Filed: Oct. 25, 2012

(65) Prior Publication Data

US 2013/0108254 A1     May 2, 2013

(30) Foreign Application Priority Data

Oct. 26, 2011   (JP) ................................ 2011-234976
Oct. 26, 2011   (JP) ................................ 2011-235099

(51) Int. Cl.
    *G03B 17/00*      (2006.01)

(52) U.S. Cl.
    USPC ........................................................ 396/420

(58) Field of Classification Search
    USPC ........................................................ 396/420
    See application file for complete search history.

(56) References Cited

U.S. PATENT DOCUMENTS 4,959,729 A * 9/1990 Fukuda et al. ................. 348/375
4,963,987 A * 10/1990 Ichiyoshi et al. ............. 348/375
6,972,925 B2 * 12/2005 Tsuchida ......................... 360/85
7,314,320 B2 * 1/2008 Nakamura ..................... 396/420
7,391,467 B2 * 6/2008 Kim ................................ 348/375
7,619,682 B2 * 11/2009 Igarashi ......................... 348/373
8,035,736 B2 * 10/2011 Son ................................ 348/376

FOREIGN PATENT DOCUMENTS

JP    2005-181718 A    7/2005
JP    2007-194952 A    8/2007

* cited by examiner

*Primary Examiner* — Rodney Fuller
(74) *Attorney, Agent, or Firm* — Rossi, Kimms & McDowell LLP

(57) ABSTRACT

An image-pickup system includes an image-pickup apparatus having a first connection member and a camera grip having a second connection member capable of being attached to and removed from the first connection member. The first connection member includes a first screw member having a male screw and a first engagement member disposed inside the first screw member having a first concavo-convex shape. The second connection member includes a second screw member having a female screw part capable of engaging with the male screw part of the image-pickup apparatus and a second engagement member disposed inside the second screw member and having a second concavo-concave shape capable of engaging with the first concavo-concave shape of the image-pickup apparatus. The male screw part screws into the female screw part in a state where the first engagement member and the second engagement member engage with each other.

10 Claims, 5 Drawing Sheets

IMAGE-PICKUP APPARATUS, CAMERA GRIP, AND IMAGE-PICKUP SYSTEM

BACKGROUND OF THE INVENTION

1. Field of the Invention

The present invention relates to an image-pickup apparatus, a camera grip, and an image-pickup system.

2. Description of the Related Art

Making the image-pickup apparatus enable take a picture in a small space and enable miniaturize an equipment so as to fix the image-pickup apparatus. Therefore, it is desirable that an image-pickup system can remove a camera grip which is unnecessary in taking a picture with the image-pickup apparatus using a tripod from the image-pickup apparatus.

Japanese Patent Laid-Open No. 2005-181718 proposes a camera grip having a grip part which can be rotated to a camera body held by a photographer when taking a picture.

However, since Japanese Patent Laid-Open No. 2005-181718 has a contact point for telecommunication in a fixed part of the camera grip, contact on the contact point does not become stable by the impact to the contact point if the fixed part of the camera grip has an external impact when attachment position is changed by rotating the camera grip.

SUMMARY OF THE INVENTION

The present invention provides an image-pickup system which can send for telecommunications in stable contact even if a camera grip has an external impact when attachment position is changed by rotating a camera grip.

An image-pickup apparatus as one aspect of the present invention is an image-pickup apparatus capable of attaching and removing a camera grip, the image-pickup apparatus includes a screw member having a male screw part capable of screwing into a female screw part formed on the camera grip, an engagement member disposed inside the male screw part, the engagement member having a concavo-convex shape capable of engaging with a concavo-convex part formed on the camera grip, and a pin jack disposed inside the engagement member, the pin jack being capable of connecting a pin plug of the camera grip.

A camera grip as another aspect of the present invention is a camera grip capable of being attached to and removed from an image-pickup apparatus, the camera grip includes a screw member having a female screw part capable of screwing with a male screw part formed on the image-pickup apparatus, an engagement member disposed inside the female screw part, the engagement member having a concavo-convex shape capable of engaging with a concavo-convex part formed on the image-pickup apparatus, and a pin plug disposed inside the engagement member, the pin plug being capable of connecting a pin jack of the image-pickup apparatus.

An image-pickup system as another aspect of the present invention is an image-pickup system includes an image-pickup apparatus having a first connection member, and a camera grip having a second connection member capable of being attached to and removed from the first connection member. The first connection member includes a first screw member having a male screw, a first engagement member disposed inside the first screw member having a first concavo-convex shape, and a pin jack disposed inside the first engagement member. The second connection member includes a second screw member having a female screw part capable of engaging with the male screw part of the image-pickup apparatus, a second engagement member disposed inside the second screw member and having a second concavo-concave shape capable of engaging with the first concavo-concave shape of the image-pickup apparatus, and a pin plug disposed inside the second engagement member and capable of connecting the pin jack of the image-pickup apparatus. And the male screw part screws into the female screw part in a state where the first engagement member and the second engagement member engage with each other.

Further features of the present invention will become apparent from the following description of exemplary embodiments with reference to the attached drawings.

DESCRIPTION OF THE PREFERRED EMBODIMENTS

Figures 1A, 1B:
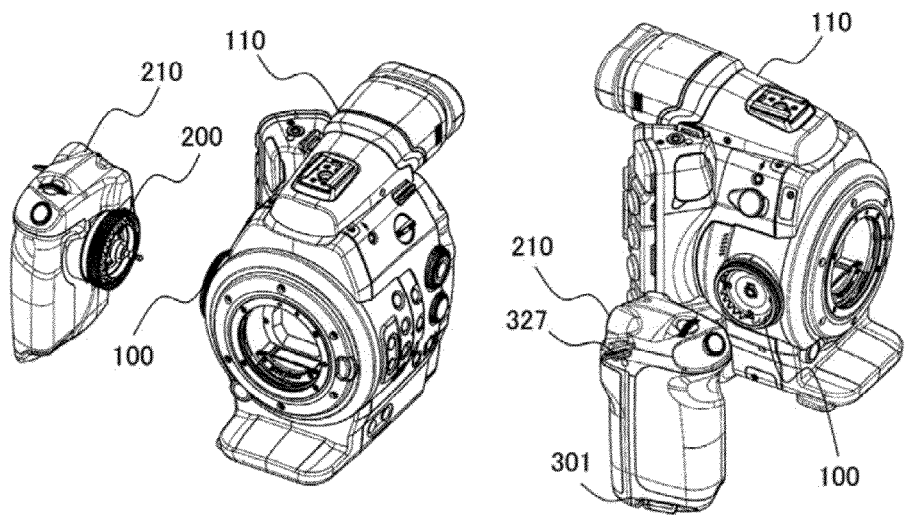
FIGS. 1A and 1B are perspective views of an image-pickup apparatus and a camera grip of embodiment applied to the present invention.

FIGS. 1A and 1B are perspective views of an image-pickup apparatus 110 and a camera grip 210 of embodiment applied to the present invention. When the camera grip 210 is rotatably attached to the image-pickup apparatus 110, the camera grip 210 and the image-pickup apparatus 110 are used as an image-pickup system of which the photographer can take a picture while holding.

Figure 2C:
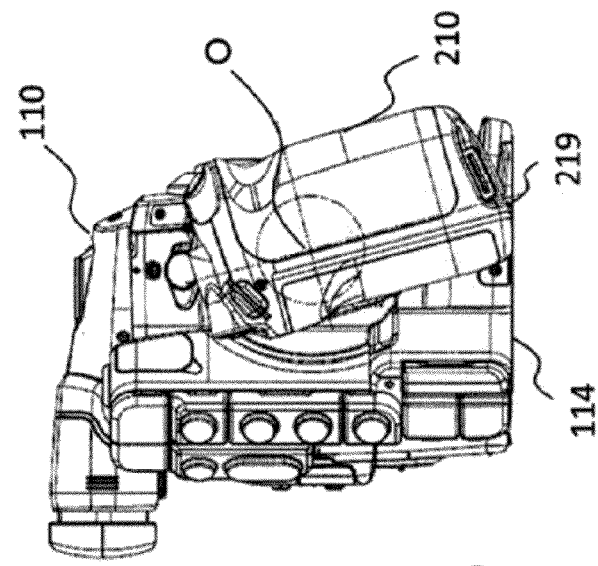
FIGS. 2A, 2B and 2C are side views showing a state in which the camera grip is attached to an image-pickup apparatus of the embodiment by rotating.
Figure 2B:
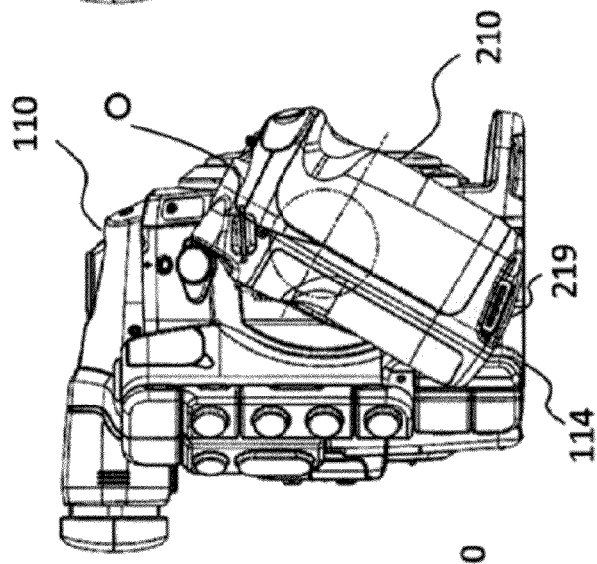
Figure 2A:
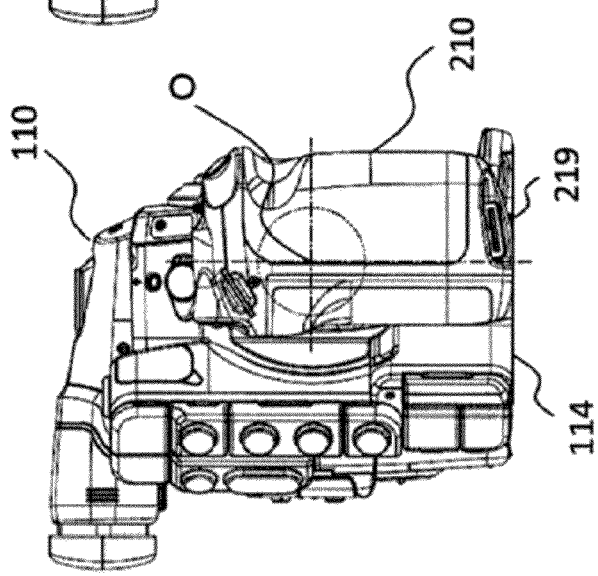

FIGS. 2A, 2B and 2C are side views showing a state in which the camera grip 210 is attached to the image-pickup apparatus 110 of the embodiment by rotating.

Reference numeral 100 denotes an image-pickup apparatus side connection member (a first connection member), and reference numeral Reference numeral 200 denotes a camera grip side connection member (a second connection member). The image-pickup apparatus 110 and the camera grip 210 are detachable according to the image-pickup apparatus side connection member 100 and the camera grip side connection member 200. Moreover, as shown in FIGS. 2B and 2C, attachment inclining the camera grip 210 to the image-pickup apparatus 110 centering on center of rotation O (center part of rotation) is possible by the image-pickup apparatus side connection member 100 and the camera grip side connection member 200.

FIG. 2A shows the state that the camera grip 210 is attached to the image-pickup apparatus 110 at normal position. Reference numeral 114 denotes a bottom part of the image-pickup apparatus 110, and reference numeral Reference numeral 219 denotes a bottom part of the camera grip 210. FIG. 2B shows the state that the camera grip 210 is rotated 30 degrees clockwise from the normal position in FIG. 2A at the center of rotation O and attached to the image-pickup apparatus 110. FIG. 2C shows the state that the camera grip 210 is rotated 15 degrees counterclockwise from the normal position in FIG. 2A at the center of rotation O and attached to the image-pickup apparatus 110. In any case, the bottom part 219 of the camera grip 210 is equal to the bottom part 114 of the image-pickup apparatus 110 in height, and they land at the same time when they are put on the plane. The bottom part 219 of the camera grip 210 and the bottom part 114 of the image-pickup apparatus 110 can land at the same time by changing a part of an outline of the camera grip 210 to arc at the center of rotation even if the camera grip 210 is rotated so as to attach to the image-pickup apparatus 110. As a result, the present invention can control fall of the image-pickup apparatus 110.

Figure 3A:
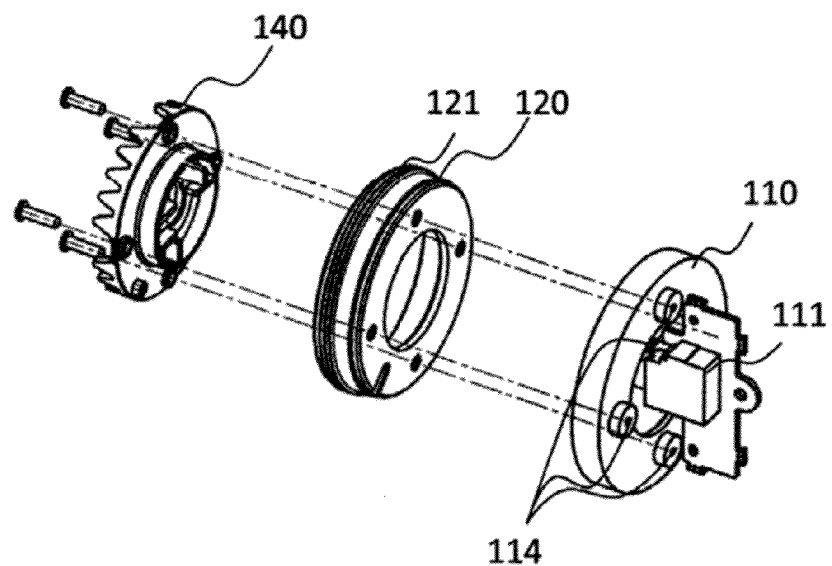
FIGS. 3A and 3B are exploded perspective views with a part of an image-pickup apparatus of the embodiment and an image-pickup apparatus side connection member.
Figure 3B:
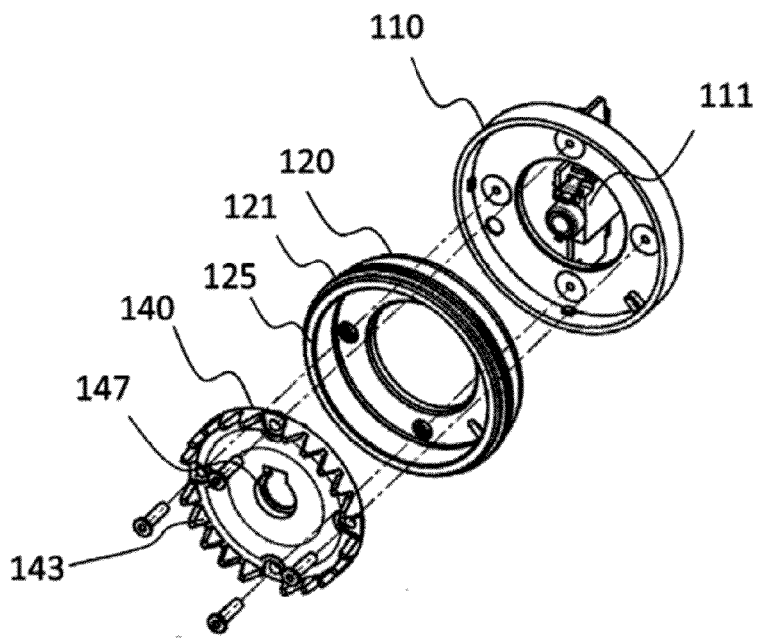

FIGS. 3A and 3B are exploded perspective views with a part of the image-pickup apparatus 110 of the embodiment and an image-pickup apparatus side connection member. FIG. 3A is an exploded perspective view seen from the same direction as FIG. 1A, and FIG. 3B is an exploded perspective view seen from the same direction as FIG. 1B.

Reference numeral 111 denotes a pin jack for telecommunication with the camera grip 210.

Reference numeral 120 denotes an image-pickup apparatus side fixed member (a first screw member), and the image-pickup apparatus side fixed member 120 can be screwed with a camera grip side fixed member described below. Reference numeral 121 denotes a male screw part, and reference numeral 125 denotes a contact surface with the camera grip side fixed member. The larger the diameter of the male screw part 121 is, the more desirable since fastening power of the camera grip 210 to the image-pickup apparatus 110 rises in proportion to the size of the screw diameter. Further, the pin jack for telecommunication 111 is provided in the space of the image-pickup apparatus side connection member 100 that arises by enlarging the screw diameter.

Reference numeral 140 is an image-pickup apparatus side engagement member (a first engagement part and a concavo-convex part of the image-pickup apparatus) which is disposed inside of the image-pickup apparatus side fixed member 120. Reference numeral 143 is a concavo-convex shape (a first concavo-convex shape) which has a plurality of gear mountain parts (convex parts) and a plurality of gear valley parts (concave parts) alternately at equal intervals and is formed on the outline of the image-pickup apparatus side engagement member 140. Reference numeral 147 denotes an opening of the image-pickup apparatus side engagement member 140.

Figure 4B:
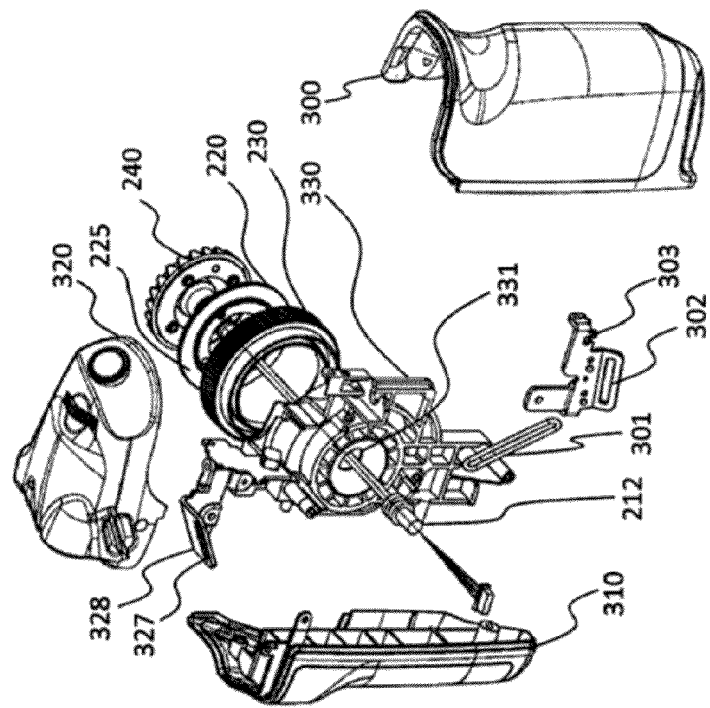
FIGS. 4A and 4B are exploded perspective views of a camera grip of the embodiment and a camera grip side connection member.
Figure 4A:
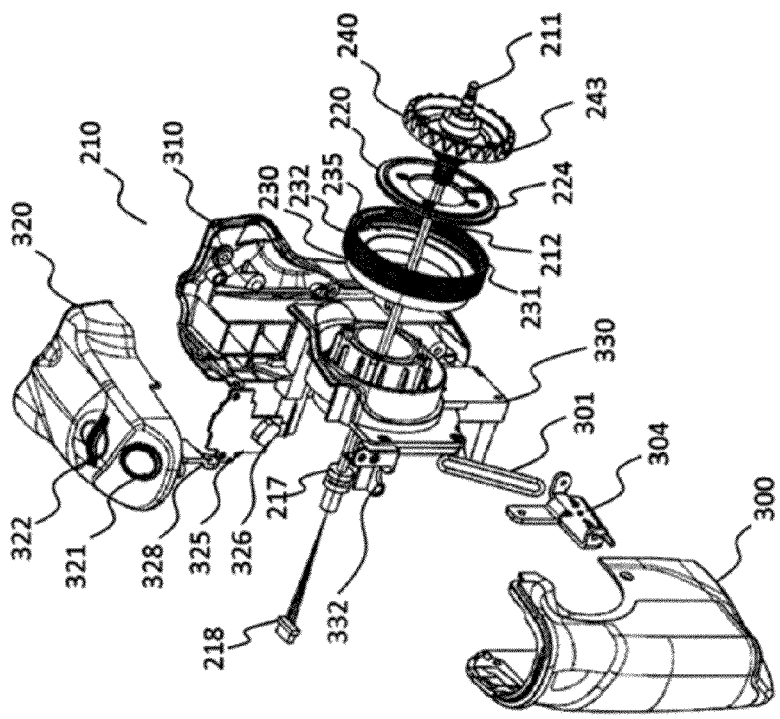

FIGS. 4A and 4B are exploded perspective views of the camera grip 210 of the embodiment and the camera grip side connection member 200. FIG. 4A is an exploded perspective view seen from the same direction as FIG. 1A, and FIG. 4B is an exploded perspective view seen from the same direction as FIG. 1B.

Reference numeral 211 denotes a pin plug for telecommunication that can be connected to the pin jack 111 for telecommunication. Reference numeral 212 denotes an extensible cable that can store in the camera grip having the pin plug for telecommunication 211 at a tip. Reference numeral 217 denotes a bush, and reference numeral 218 denotes an electric connection connector. The electric connection connector 218 is provided at a tip opposite the pin plug for telecommunication 211 of the cable 212. The bush 217 is disposed between the pin plug for telecommunication 211 and the electric connection connector 218. It is possible to adjust the amount of pullout of the cable 212 from the camera grip 210 by moving the position of the bush 217.

Reference numeral 220 denotes a camera grip side fixed member. Reference numeral 224 denotes a contact surface with the image-pickup apparatus side fixed member 120. Reference numeral 225 denotes a contact surface with a fastener member 230 described below.

Reference numeral 230 denotes a fastener member (a second screw member). Reference numeral 231 denotes a male screw part, reference numeral 232 is a finger lying part and reference numeral 235 is a contact surface with the contact surface with the image-pickup apparatus side fixed member 120. Further, the fastener material 230 is biased in the rotational axis direction of the center of rotation O by compression spring (a biasing member) as not shown in the figure provided the camera grip 210 side of the fastener material 230. Thus, the male screw part 121 is screwed with the female screw part 231 by adding only the rotational power without pressing the fastener material 230 against the image-pickup apparatus 110 side.

As with the image-pickup apparatus side connection part 100, the larger the diameter of the female screw part 231 is, the more desirable since fastening power of the camera grip 210 to the image-pickup apparatus 110 rises in proportion to the size of the screw diameter. Further, the pin plug for telecommunication 211 is provided in the space of the camera grip side connection member 200 that arises by enlarging the screw diameter.

Reference numeral 240 denotes a camera grip side engagement member (a second engagement part and a concavo-convex part of the camera grip) which is disposed inside of the camera grip side fixed member 220. Reference numeral 243 denotes a concavo-convex shape (a second concavo-convex shape) which has alternately a plurality of gear mountain parts (convex parts) and a plurality of gear valley parts (concave parts) at equal intervals and is formed on the outline of the camera grip side engagement member 240. Further, an inner peripheral wall is formed in the inner circumference of the concavo-convex shape 243.

Reference numeral 300 denotes a front cover of the camera grip 210, reference numeral 310 denotes a back cover of the camera grip 210, reference numeral 320 denotes a top cover of the camera grip 210, and reference numeral 330 denotes a connection member fixed cover. Further, the camera grip 210 has a grip belt not shown in the figure.

Reference numeral 301 denotes an elastic member, reference numeral 302 denotes a belt hole, reference numeral 303 denotes an elastic member lying groove for retaining the elastic member 301, and reference numeral 304 denotes a grip belt hanging hook having the belt hole 302 and the elastic member lying groove 303. They are attached to the front cover 300. The elastic member 301 is O character type, and is inserted by the cable. In addition, the elastic member lying groove 303 is provided on a place separated from an insertion opening 331 of the cable 212 described below so as to easily adjust tension of the elastic member 301 and the amount of pullout of the cable 212. Further, a part for only retaining the elastic member 301 is not necessary by forming the elastic member lying groove 303 in the grip belt hanging hook 304.

Reference numeral 321 denotes s START/STOP switch that can instruct beginning and end for taking a picture, reference numeral 322 denotes a stop adjustment dial that can adjust stop of a lens (not shown). Further, a display expansion switch that can enlarge cut part of a display area positioned in the back cover 310 side and an arrow key that can move a cursor in a menu displayed in a display positioned in the back side cover 310 are disposed in the top cover 320.

Reference numeral 325 denotes a substrate, reference numeral 326 denotes an electric connection housing, reference numeral 327 denotes a belt hall and reference numeral 328 denotes a grip belt hanging hook having the belt hall 327.

An electric signal of a control switch is gathered in the substrate 325, and is connected to the image-pickup apparatus 110 through the electric connection housing 326, the electric connection connector 218, the pin plug for telecommunication 211 and the pin jack for telecommunication 111.

Reference numeral 331 denotes an insertion opening into which the electric connection connector 218 and the bush 217 of the cable 212 can insert and the pin plug for telecommunication 211 cannot insert. Further, the insertion opening 331 is horseshoe that can engage with the bush 217 of the cable 212. Reference numeral 332 denotes a horseshoe that can engage with the bush 217 of the cable 212. Both the insertion opening 331 and the horseshoe 332 are provided at the connection member fixed cover 330. The situation that the pin plug for telecommunication 211 drops in the camera grip 210 and the user does not extract the pin plug for telecommunication 211 is avoided since the insertion opening 331 is an open mouth like the above-mentioned.

The grip belt is held by the hanging hook 304 attached to the front cover 300 and the grip belt hanging hook 328 attached to the top cover 320, and holds a shell application (not shown) so as to guard the back of one's hand when user holds the camera grip 210. At this time, barrel polishing for removing burr is applied to the grip belt hanging hook 304, 328 so that user is not injured with burr since user touches the grip belt hanging hook 304,328. Additionally, the grip belt hanging hook 304 does not damage and break the elastic member 301. As with the grip belt hanging hook 304,328, it is necessary to apply barrel polishing to a part that user may touch, i.e. a formed part and a cutting part.

Figure 5:
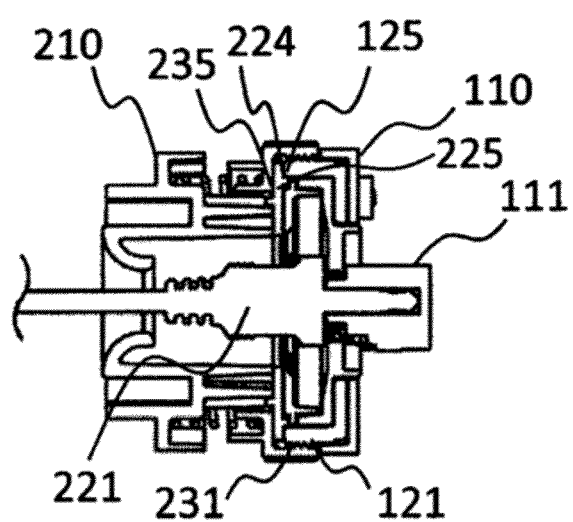
FIG. 5 is a cross-sectional view of the connection member when a camera grip of the embodiment is fixed to an image-pickup apparatus.

FIG. 5 is a cross-sectional view of the connection member when the camera grip 210 of the embodiment is fixed to the image-pickup apparatus 110.

First of all, the pin plug for telecommunication 211 is inserted into the pin jack for telecommunication 111 so as to fix the camera grip 210 to the image-pickup apparatus 110. Next, the concavo-convex shape 143 of the image-pickup apparatus side engagement member 140 and the concavo-convex shape 243 of the camera grip side engagement member 240 are engaged at an arbitrary attachment position. The camera grip 210 is prevented from rotating from the attachment position to the image-pickup apparatus 110 by engaging both concavo-convex shapes. Further, as previously explained, it is possible to change a relative position relation between the image-pickup apparatus 110 and the camera grip 210 centering on the center of rotation O by changing the engagement relation.

After, the male screw part 121 is screwed with the female screw part 231. Thus, a contact surface 125 with the camera grip side fixed member comes in contact the contact surface 224 with the image-pickup apparatus side fixed member 120. In addition, the contact surface 225 with the fastener member 230 comes in contact the contact surface 235 with the camera grip side fixed member. The image-pickup apparatus 110 and the camera grip 210 are fixed by these contact surfaces.

The pin jack for telecommunication 111 and the pin plug for telecommunication 211 are used for pin type telecommunication point, and further are positioned at the center of rotation O. Thus, the pin plug for telecommunication 211 can be prevent from coming off by stress since the pin plug for telecommunication 211 easily moves according to rotation of the camera grip 210. Further, the pin plug for telecommunication 211 can be prevented from coming off by unintended operation of the user since there is cable 212 in connected structure.

Telecommunication is done by using the pin plug and the pin jack in this embodiment. If the pin plug connects the pin jack, the rotation of the pin plug to the pin jack is allowed. Telecommunication may be done by a spring connector using the space inside the connection member instead of connection between the pin plug and the pin jack. Further, noncontact communication by an optical communication and an electric wave communication may be used.

The cable 212 is attached to the camera grip 210 as follows. The cable 212 is inserted into the electric connection connector 218, the bush 217, insertion opening 331 and the elastic member 301, in order. The bush 217 is engaged with the horseshoe 332, and finally the electric connection connector 218 is inserted into the electric connection housing 326 of the substrate 325.

It is difficult to transmit to the pin plug for the telecommunication 211 provided on the edge of the cable 212 since the cable 212 is worked as a buffer if the exterior camera grip 210 has an impact. And, the pin plug 211 for telecommunication is prevented from coming off by the impact.

Further, power works at the direction where the cable 212 is stored in the camera grip 210 when the pin plug for telecommunication 211 is pulled out from the camera grip 210 by the elastic member 301. Therefore, it is not necessary to tuck the cable 212 in the connected structure since the cable 212 is drawn in when the camera grip 210 is fixed to the image-pickup apparatus 110.

At this time, it is desirable that the pull force of the elastic member 301 is less than the joint power between the pin jack for telecommunication 111 and the pin plug for telecommunication 211 so as to prevent the pin plug for telecommunication 211 from coming off by the pull force of the elastic member 301. In addition, for the same reason, it is desirable that there is no pull force from the elastic member 301 when the camera grip is fixed.

And, since the bush 217 is engaged with the horse shape 332 hooks together to horseshoe 332, bush 217 becomes a stopper when the cable 212 is pulled from the camera grip 210 too much.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2011-234976, filed on Oct. 26, 2011, and 2011-235099, filed on Oct. 26, 2011, which are hereby incorporated by reference herein in their entirety.

What is claimed is:

1. An image-pickup apparatus capable of attaching and removing a camera grip, the image-pickup apparatus comprising:
    a screw member having a male screw part capable of screwing into a female screw part formed on the camera grip;
    an engagement member disposed inside the male screw part, the engagement member having a concavo-convex shape capable of engaging with a concavo-convex part formed on the camera grip; and
    a pin jack disposed inside the engagement member, the pin jack being capable of connecting a pin plug of the camera grip.

2. A camera grip capable of being attached to and removed from an image-pickup apparatus, the camera grip comprising:
    a screw member having a female screw part capable of screwing with a male screw part formed on the image-pickup apparatus;
    an engagement member disposed inside the female screw part, the engagement member having a concavo-convex shape capable of engaging with a concavo-convex part formed on the image-pickup apparatus; and a pin plug disposed inside the engagement member, the pin plug being capable of connecting a pin jack of the image-pickup apparatus.

3. The camera grip according to claim 2, wherein the pin plug is formed on a tip of a cable which is stored inside the camera grip and is capable of being pulled from the inside of the engagement member.

4. The camera grip according to claim 2, an inner peripheral wall is formed on an inner circumference of the concavo-convex shape of the engagement member.

5. The camera grip according to claim 2, further comprising:
a biasing member configured to bias the screw member in a rotational axis direction.

6. An image-pickup system comprising:
an image-pickup apparatus having a first connection member; and
a camera grip having a second connection member capable of being attached to and removed from the first connection member,
wherein the first connection member includes a first screw member having a male screw, a first engagement member disposed inside the first screw member having a first concavo-convex shape, and a pin jack disposed inside the first engagement member,
wherein the second connection member includes a second screw member having a female screw part capable of engaging with the male screw part of the image-pickup apparatus, a second engagement member disposed inside the second screw member and having a second concavo-concave shape capable of engaging with the first concavo-concave shape of the image-pickup apparatus, and a pin plug disposed inside the second engagement member and capable of connecting the pin jack of the image-pickup apparatus, and
wherein the male screw part screws into the female screw part in a state where the first engagement member and the second engagement member engage with each other.

7. The image-pickup system according to claim 6, wherein the pin plug is formed on a tip of a cable which is stored inside the camera grip, and is capable of being pulled from the inside of the second engagement member.

8. The image-pickup system according to claim 6,
wherein each of the first and second concavo-convex shapes has a plurality of concave parts and convex parts alternately at equal intervals, and
wherein a relative positional relationship between the image-pickup apparatus and the camera grip is changed by changing an engagement relationship between the first concavo-convex shape of the image-pickup apparatus and the second concavo-convex shape of the camera grip.

9. The image-pickup system according to claim 6, wherein an inner peripheral wall is formed on an inner circumference of the second concavo-convex shape of the second engagement member.

10. The image-pickup system according to claim 6, wherein the camera grip includes a biasing member configured to bias the second screw member in a rotational axis direction.

* * * * *